(12) United States Patent
Rallo et al.

(10) Patent No.: US 9,235,253 B2
(45) Date of Patent: Jan. 12, 2016

(54) CONTROL SYSTEM FOR POWER CONTROL

(71) Applicant: TSO LOGIC INC., Vancouver (CA)

(72) Inventors: Aaron J Rallo, Vancouver (CA);
Christopher Tivel, Vancouver (CA)

(73) Assignee: TSO LOGIC INC., Vancouver (CA)

( * ) Notice: Subject to any disclaimer, the term of this patent is extended or adjusted under 35 U.S.C. 154(b) by 258 days.

(21) Appl. No.: 13/829,167

(22) Filed: Mar. 14, 2013

(65) Prior Publication Data

US 2014/0281644 A1 Sep. 18, 2014

(51) Int. Cl.

| | |
|---|---|
| *G06F 11/30* | (2006.01) |
| *G06F 11/32* | (2006.01) |
| *G06F 1/32* | (2006.01) |
| *G06Q 10/04* | (2012.01) |
| *G06F 9/445* | (2006.01) |
| *H04L 29/08* | (2006.01) |
| *G06F 9/44* | (2006.01) |
| *H04L 12/24* | (2006.01) |
| *G06F 15/16* | (2006.01) |

(52) U.S. Cl.
CPC .............. *G06F 1/3206* (2013.01); *G06Q 10/04* (2013.01); *G06F 9/4443* (2013.01); *G06F 9/44505* (2013.01); *G06F 15/161* (2013.01); *H04L 12/24* (2013.01); *H04L 41/22* (2013.01); *H04L 67/325* (2013.01)

(58) Field of Classification Search
CPC . G06F 9/4443; G06F 9/44505; G06F 15/161; H04L 12/24; H04L 41/22; H04L 67/325
USPC .......................... 713/300, 310, 320, 330, 340
See application file for complete search history.

(56) References Cited

U.S. PATENT DOCUMENTS

| | | | |
|---|---|---|---|
| 7,756,972 | B2 | 7/2010 | Ma |
| 8,335,208 | B2 | 12/2012 | Denis |
| 2009/0106571 | A1 | 4/2009 | Low et al. |
| 2009/0187782 | A1 | 7/2009 | Greene et al. |
| 2009/0235104 | A1 | 9/2009 | Fung |
| 2011/0239013 | A1 | 9/2011 | Muller |
| 2012/0065802 | A1 | 3/2012 | Seeber et al. |
| 2012/0144219 | A1 | 6/2012 | Salahshour et al. |
| 2012/0323368 | A1 | 12/2012 | White et al. |

OTHER PUBLICATIONS

International Search Report and Written Opinion for PCT/US14/25577, mailed Sep. 16, 2014, 8 pages.
International Search Report and Written Opinion for PCT/US14/25554, mailed Aug. 7, 2014, 9 pages.

*Primary Examiner* — Michael J Brown
(74) *Attorney, Agent, or Firm* — Sheppard, Mullin, Richter & Hampton LLP; Carina Tan

(57) ABSTRACT

A power control system for saving power by powering on enough application servers to satisfy the current load workload as well as any required reserve capacity based on administrative settings is disclosed. As the load increases, more servers are powered on. As the load decreases some servers are powered off. The power control system provides a reasonable end user experience at the least cost based on power consumption of the servers.

31 Claims, 9 Drawing Sheets

FIG. 2

CONTROL SYSTEM FOR POWER CONTROL

TECHNICAL FIELD

The present invention is directed to power control systems.

BRIEF DESCRIPTION OF THE DRAWINGS

FIG. 2 illustrates sample icons for the power control system GUI, according to certain embodiments.

DETAILED DESCRIPTION

According to certain embodiments, a power control system saves power in data centers by powering on enough application servers to satisfy the current load workload as well as any required reserve capacity based on administrative settings. As the load increases, more servers are powered on. As the load decreases some servers are powered off. The goal is to provide an acceptable end user experience at the least cost based on power consumption of the servers.

According to certain embodiments, the power control system provides an interactive graphical user interface to allow a user to obtain information on the following: 1) How much load can a given server handle and still deliver an acceptable user experience; 2) What is an acceptable user experience; How sensitive should the system be with respect to powering servers on and off so that the servers are not being powered on and off too frequently.

According to certain embodiments, the power control system provides an interactive graphical user interface to allow a user to view the current state of a data center or server farm or a subset thereof, wherein the current state includes the loads carried by the servers, which servers are powered on or off, and the state of the servers that are powered on. Such a graphical user interface provides the information mentioned herein at various levels of granularity selected by the user. For example, the user can view information at a server level or at a server pool level or at the server farm level. According to certain embodiments, the power control system may be managing one or more server farms comprising one or more server pools which in turn comprises one or more servers.

Figure 1:
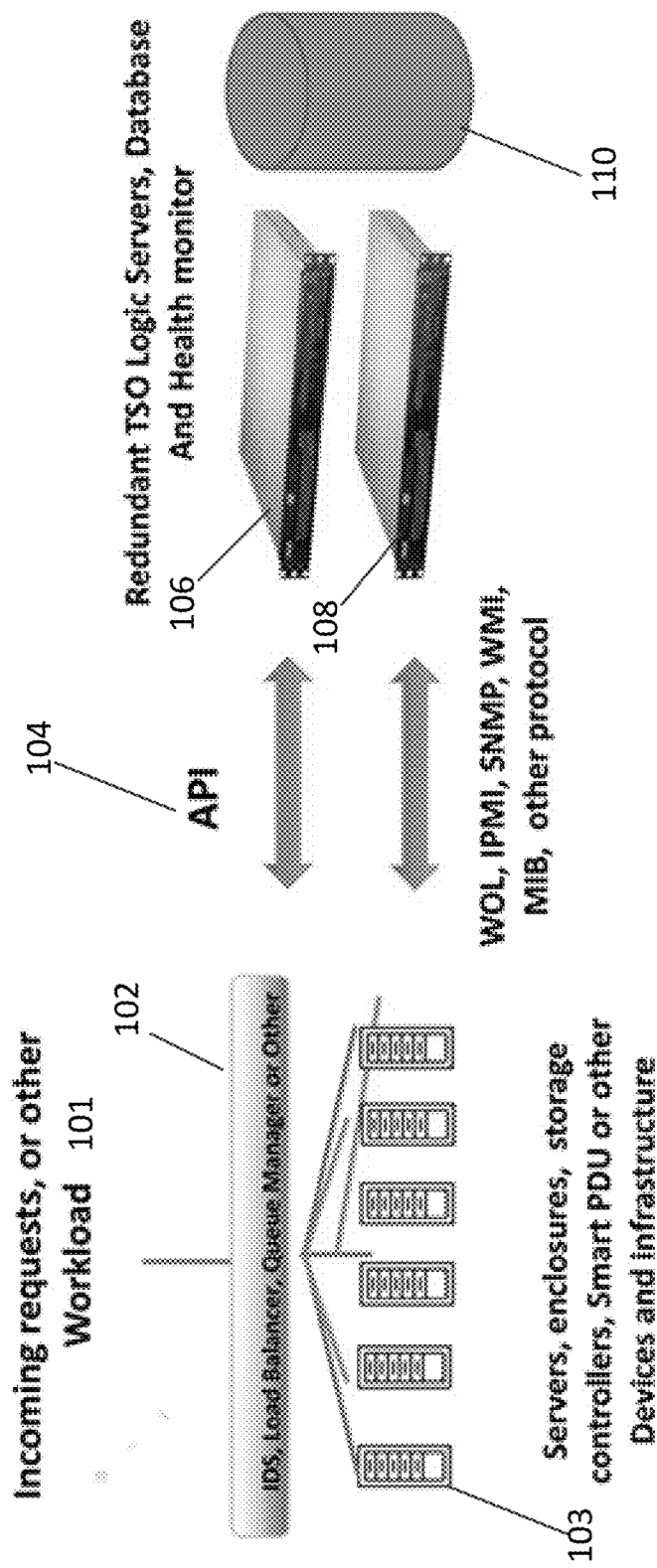
FIG. 1 illustrates a high-level diagram of the power control system that can be used for power management including saving power, according to certain embodiments.

FIG. 1 illustrates a high-level diagram of the power control system that can be used for power management including saving power, according to certain embodiments. FIG. 1 shows incoming requests or other workload 101 going to the intrusion detection software, load balancer, queue manager etc 102 that is associated with servers, enclosures, storage controllers, smart PDUs or other devices and infrastructure etc (also referred to as "server farms" herein) 103. FIG. 1 also shows API 104 and database 110. According to certain embodiments, the power control servers 106, 108 include a health monitor system that checks to see if all the servers and devices are in proper working order. A user such as a data center manager can use the power control servers to obtain power related information associated with the server farm(s) in order to save power and efficiently operate the server farm. According to certain embodiments, power control server monitors the traffic sent by load balancer to each pool and determines the number of servers that are turned on in the pool is appropriate for the current load sent to the pool. If the load sent to a pool can be serviced a fewer number of servers without affecting response times to the incoming requests/workload, then one or more servers in the pool/farm are automatically powered down. On the other hand, if the load sent to a pool needs additional servers in order to adequately service the load, then additional servers in the pool are powered up. The functions of power control server may be implemented as a distributed system.

According to certain embodiments, the maximum load that a server can handle is determined by 1) selecting a period of time (e.g., a user specified interval of time) during which the system was operational, 2) specifying performance thresholds for a number of parameters, and 3) observing the result. After the maximum load for each server in the pool or a subset thereof is determined then the power management function of the power control system can be activated to automatically power servers off or on based on the system loads. According to certain embodiments, loads include incoming workload and server utilization. If the maximum load per server falls below a calculated threshold and stays at that level for a period of time (power down sensitivity), then the power control server powers down the given server The power control server informs the load balancer that a given server will be powered down (powered off) so that the load balancer can stop sending client requests to that server. Once there are no more pending requests on that particular server, the power control server issues a "suspend" command to the particular server so that it will power it down. If the maximum load per server rises above the calculated threshold and stays at that level for a period of time (power up sensitivity), then the power control server powers up the given server. For example, the power control server issues a "resume" command to a powered down server to that the particular powered down server will power up. According to certain embodiments, the power control server wits for a period of time (a power up delay) while the particular server boots up and then the power control server informs the load balancer that the particular server is powered up so that the load balancer can begin to distribute loads to this server. According to certain embodiments, after another delay, (a steady state delay after power up) while the group of servers (data center, server farm, server pool or some subset thereof) achieves a steady state where the load is evenly distributed across the powered up servers in the group, the power control server resumes making power management decisions based in the system load.

Figure 2:
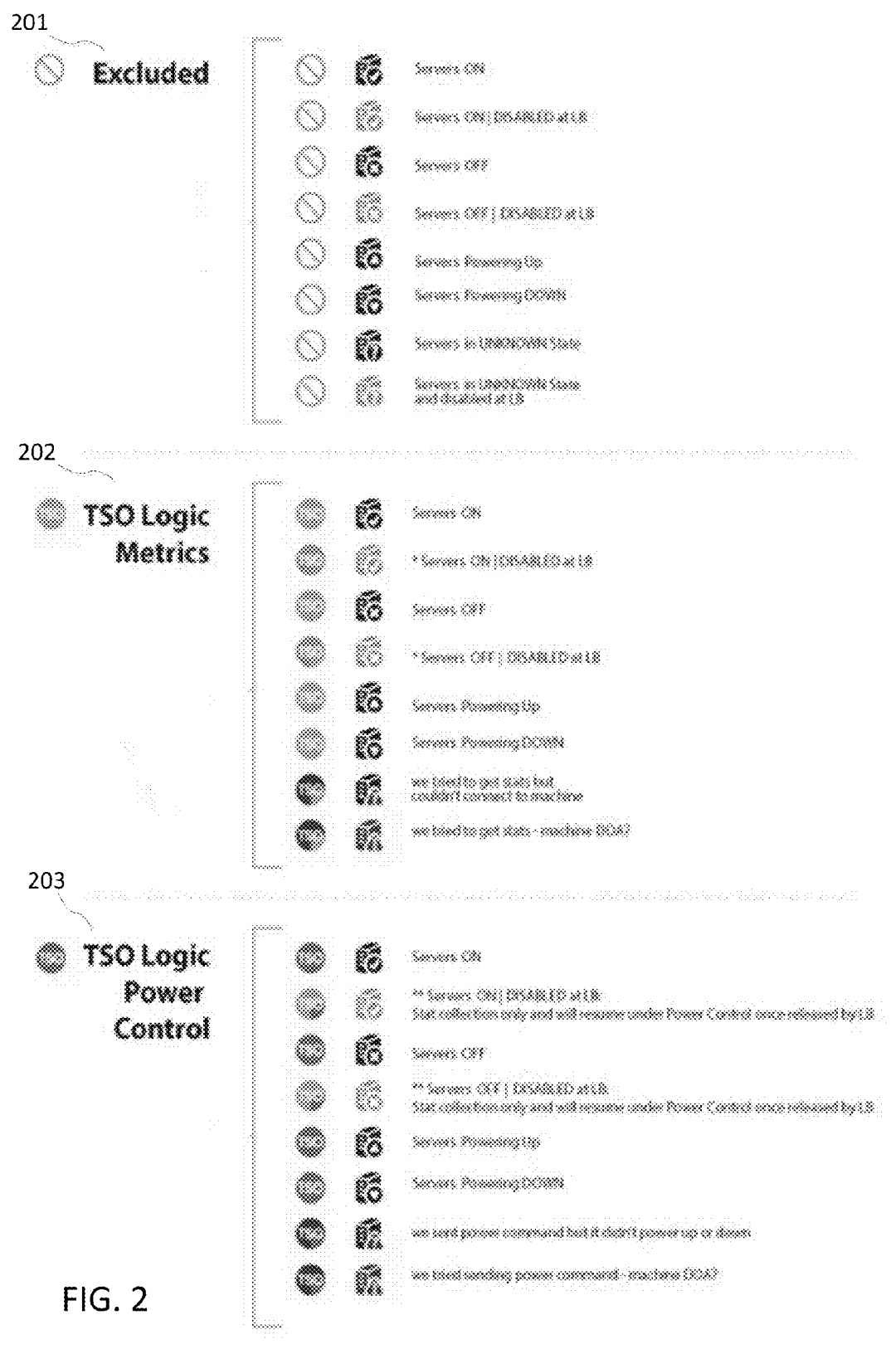

FIG. 2 shows sample icons for the power control system GUI, according to certain embodiments. FIG. 2 shows some non-limiting examples of:

icons 201 to show devices that are excluded from power control management icons 202 to show devices that are included for metrics collection (collection of statistical data)

icons 203 to show devices that are included for from power control management.

The icons are implemented in different colors. For example, orange denotes that the monitored devices are in metrics mode, green denotes that the monitored devices are under power control mode, red denotes that there may be something wrong with the monitored devices. An icon may be bi-colored to denote a transition state, for example.

According to certain embodiments, some of the functions of the power control server include collecting load information from the load balancer and collecting system performance data from the servers that are being managed. The power control server uses the collected information to decide when and which servers to power up or down.

According to certain embodiments, the load balancer classifies individual servers in the group of servers that are being managed as either "enabled" or "disabled". If a server is enabled, the load balancer will forward requests to enabled servers but does not forward requests to disabled servers.

According to certain embodiments, before powering down a given server in the managed group, the power control system will disable the given server at the load balancer. The power control system will enable the given server at the load balancer after the power control system powers up the given server.

Power management using the power control system can be a global setting. If power management is activated for the data center, then the power control system will automatically manage the power state of the servers in the managed group. For example, the power control system will automatically determine when and which servers in the managed group to power up or down. If power management is deactivated, then the power control system will not affect the power state of the servers in the group. Further, the users of the power control system can select servers that are to be excluded from power management regardless of whether power management has been activated or deactivated globally for the data center. The power state of the excluded servers will not be affected even though the power management is activated.

In addition to automated power management, the power control system allows a user to manually change the power state of one or more servers in the group of servers. Users can power on/off all servers in a given server farm, or power on/off all servers in a given pool of servers, or power on/off individual servers. The user can perform such manual changes to the power state of the servers whether or not system-wide power management is activated or deactivated. However, the user cannot perform such manual changes to the power state of servers that were "excluded" from power management. As described herein, the user has the ability to select server farms, or server pools, or individual servers in the data center for exclusion from power management. Further, when the user manually controls power to a given server farm, or server pool, or individual servers in the data center, then such servers (in the given server farm, or server pool, or the individual servers) become "excluded" from the automated power management. According to certain embodiments, the user needs to "un-excluded" the excluded servers before such servers can be managed either manually by the user or managed automatically by the power control system.

According to certain embodiments, the graphical user interface of the power control system supports the following functionality:
Real-time graphs showing system status:
  Farm, pool, and server level
  Load: connections, requests
  Servers being used: Maximum number of servers available, current number of powered on servers
  Performance: Response time, CPU utilization, memory utilization, disk utilization, network utilization, queued requests, power consumption
    Ability to change time period
    Ability to change sample interval
    Ability to configure the maximum load per server
  Ability to configure basic system parameters:
    Load balancer IP address
    Load balancer port
    Statistics collection interval
    Power up/down sensitivity
    Maximum servers to power up at a given time
    Cost of power ($ per kWh)
    Server power consumption
Ability to calculate power and cost savings based on system load over a selected time period and extrapolate to other time periods (e.g., daily, weekly, monthly, yearly).

FIG. 3-FIG. 9 illustrate a sample GUI that can be implemented for the power control system as described herein. The power control system is not limited to the sample GUI illustrated in FIG. 3-FIG. 9. The features described with reference to and FIG. 3-FIG. 9 are not restricted to the look and feel as shown in FIG. 3-FIG. 9 and can vary from implementation to implementation. FIG. 3-FIG. 9 are to be regarded in an illustrative rather than a restrictive sense. The icons in the GUI are implemented in different colors. For example, orange denotes that the monitored devices are in metrics mode, green denotes that the monitored devices are under power control mode, red denotes that there may be something wrong with the monitored devices. The embodiments are not restricted to specific colors and can vary from implementation to implementation.

Figure 3:
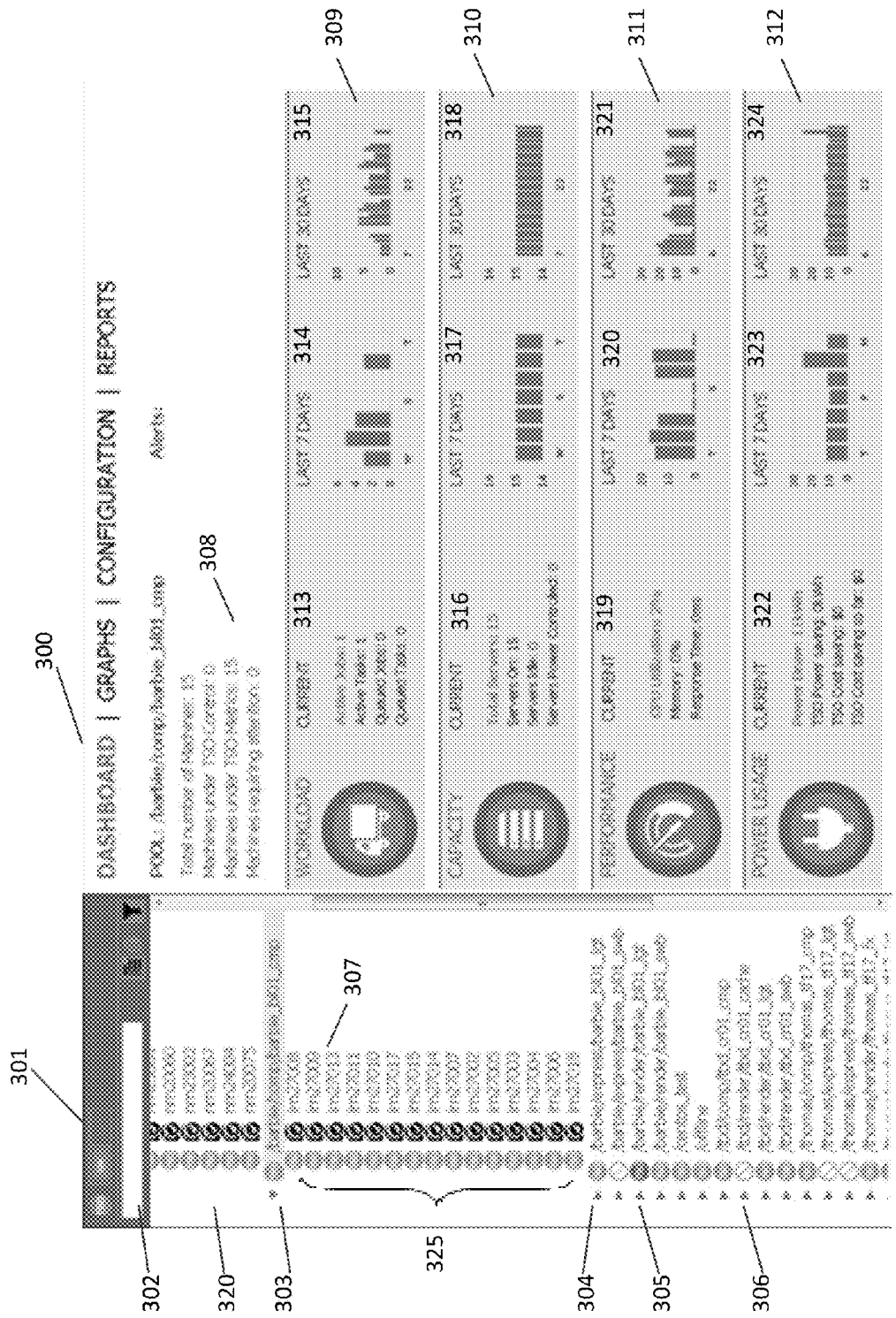
FIG. 3 illustrates a sample GUI that can be implemented for the power control system, according to certain embodiments.

FIG. 3 illustrates a sample GUI that can be implemented for the power control system. FIG. 3 shows a screen shot of a dashboard 300 for the power control system. Dashboard 300 includes a left pane 301 that shows the network hierarchy of servers 320 with their associated icons. A user can also search for a particular server in the network hierarch by typing the name of the server at search box 302.

The network hierarchy of servers 320 several levels. For example, the network hierarchy of servers 320 can have top level (such as the data center level), a secondary level (such as server farm level), a third level (such as a server pool level) and nodes within a server pool. FIG. 3 shows several server pools such as server pool 303, 304, 305 and 306, to name a few of the pools shown. Each server pool has one or more server nodes. For example, server pool 303 has server nodes 325. Each level of network hierarchy of servers has associated with it a set of icons to show system level status and server level status. herein. For example server pool 304 is associated with an icon that indicates that metric collection is enabled for server pool 304. Server pool 305 is associated with an icon that indicates that power control is enabled for server pool 305 (for example, a green icon denotes that the monitored devices are under power control mode). Server pool 306 is associated with an icon that indicates that server pool 306 is excluded from automated power control. Server node 307 is associated with an icon that indicates that metric collection (for example, an orange icon can be used to denote the metric collection mode) is enabled for server node 307 and that server node 307 is powered on and is enabled at the load balancer.

Dashboard 300 also shows metrics for a selected level of network hierarchy of servers. A user can select servers at any level in the network hierarchy of servers 320 to obtain metric information. For example, FIG. 3 shows that server pool 303 is selected for generating and displaying of associated metric information such as summary information 308, workload information 309, capacity information 310, performance information 311, and power usage information 312.

Summary information 308 includes but is not limited to information such as total number of machines, machines under power control, machines under metric collection, and machines requiring attention (for example, servers with red icon may require attention). By using the power control system, the user can configure the contents of the summary information. Summary information may vary from implementation to implementation.

Workload information 309 includes but is not limited to number of active jobs, number of active tasks, number of queued jobs and number of queued tasks that are current 313, in the last 7 days 314 and in the last 30 days 315. According to certain embodiments, by using the power control system, the user can configure the parameters for the workload information 309 such as number days over which the workload information is collected and the types of work load. Workload information may vary from implementation to implementation.

Capacity information 310 includes but is not limited to the total number of servers, the number of server on, number of servers idle, number of servers that are under power control that are current 316, in the last 7 days 317 and in the last 30 days 318. According to certain embodiments, by using the power control system, the user can configure the parameters for the capacity information 310 such as number days over which the capacity information is collected and the types of capacity information. Capacity information may vary from implementation to implementation.

Performance information 311 includes but is not limited to CPU utilization, memory usage and response time that are current 319, in the last 7 days 320 and in the last 30 days 320. According to certain embodiments, by using the power control system, the user can configure the parameters for the performance information 311 such as number days over which the performance information is collected and the types of performance information. Performance information may vary from implementation to implementation.

Power usage information 312 includes but is not limited to power savings, cost savings in real-time, and costs savings to date that are current 322, in the last 7 days 323 and in the last 30 days 324. According to certain embodiments, by using the power control system, the user can configure the parameters for the power usage information 312 such as number days over which the power usage information is collected and the types of power usage information, Power usage information may vary from implementation to implementation.

Figure 4:
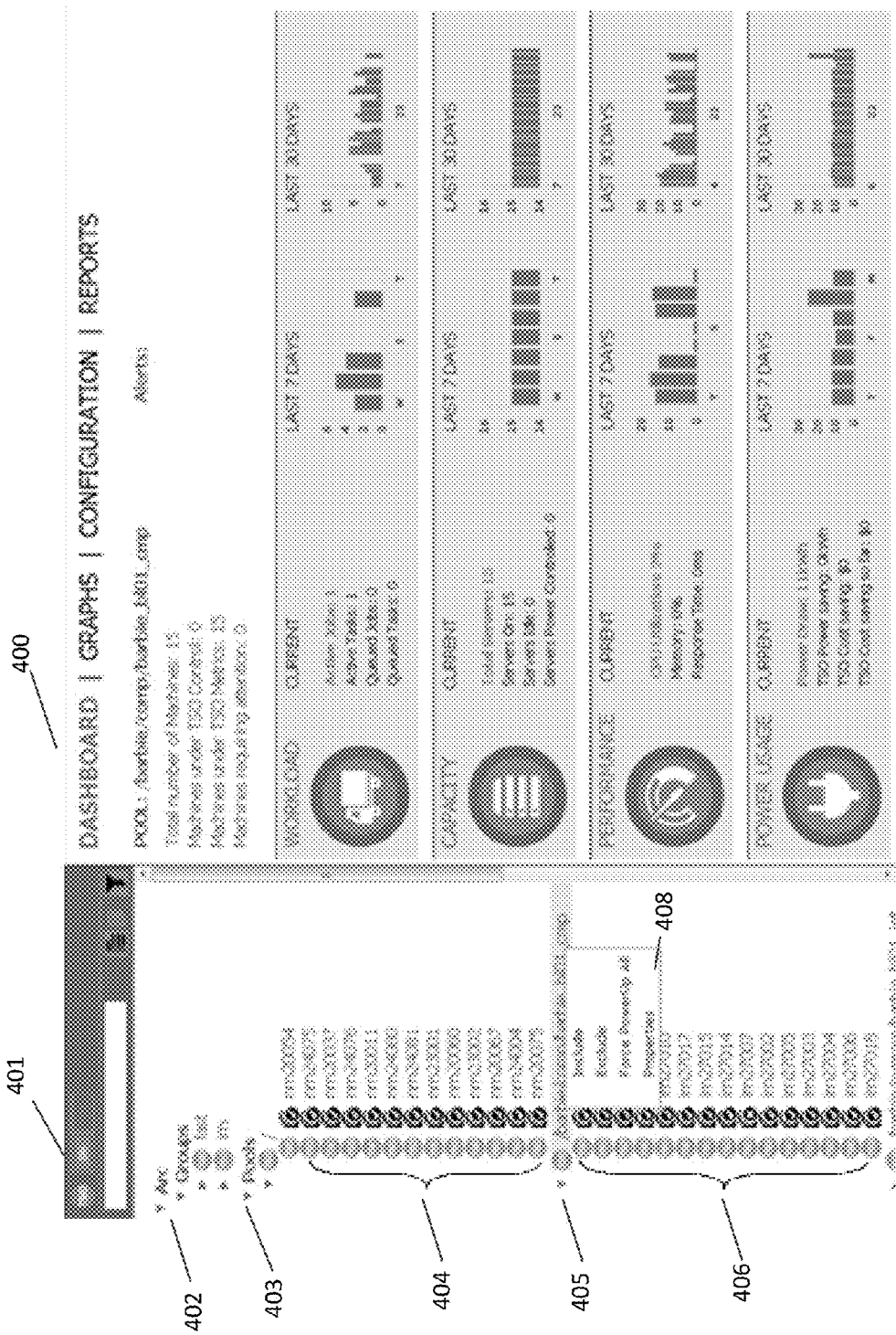
FIG. 4 shows a screen shot of various dashboard for the power control system, according to certain embodiments.

FIG. 4 shows a screen shot of a dashboard 400 for the power control system. Dashboard 400 includes a left pane 401 that shows the network hierarchy of servers with their associated icons. For purposes of illustration, in FIG. 4, the network hierarchy of servers includes a top level such as server farm 402, a secondary level such as server pools 403, 404, and a third level such as server nodes 404, 406. By using a pull down menu 408 at any level in the network hierarchy of servers, the user can include, exclude, force power up or view properties of the selected data center, or of the selected server farm or of the selected server pool or of the selected server nodes.

Figure 5:
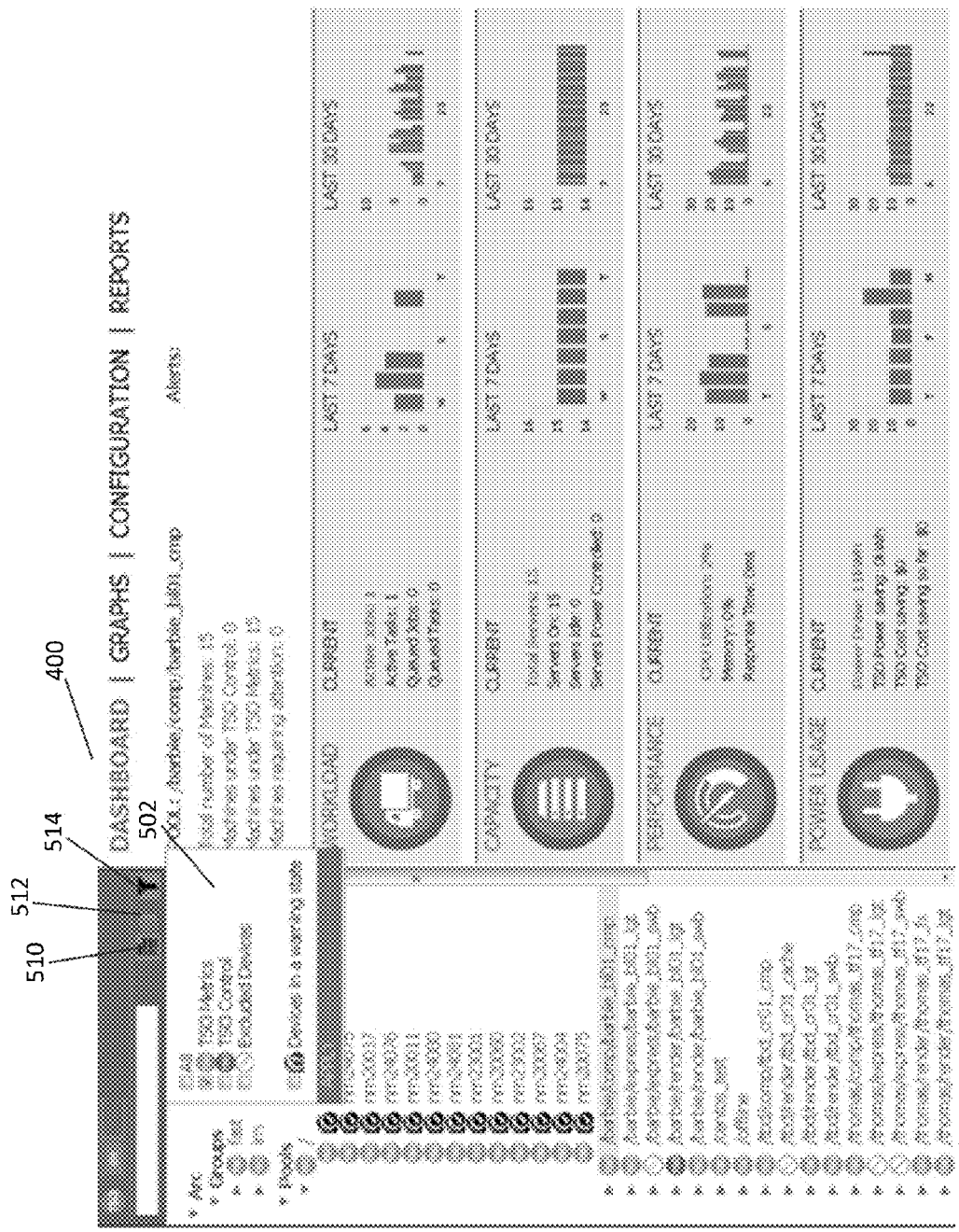
FIG. 5 shows a screen shot of various features of a dashboard for the power control system, according to certain embodiments.

FIG. 5 shows a screen shot of a dashboard 500 for the power control system. According to certain embodiments, dashboard 500 includes a device hierarchy display option 510, a non-hierarchical display of all devices option 512 and a filter option 514. The left pane of FIG. 5 shows a device hierarchy display of Arc/Groups/pools/servers in the pool.

When the filter option 514 is selected, the user gets a pull down check box menu 502 that a user can use to: 1) activate metric collection, 2) activate automated power control, 3) exclude from automated power control, and 4) display devices in a warning state at any level of the network hierarchy selected by the user.

Figure 6:
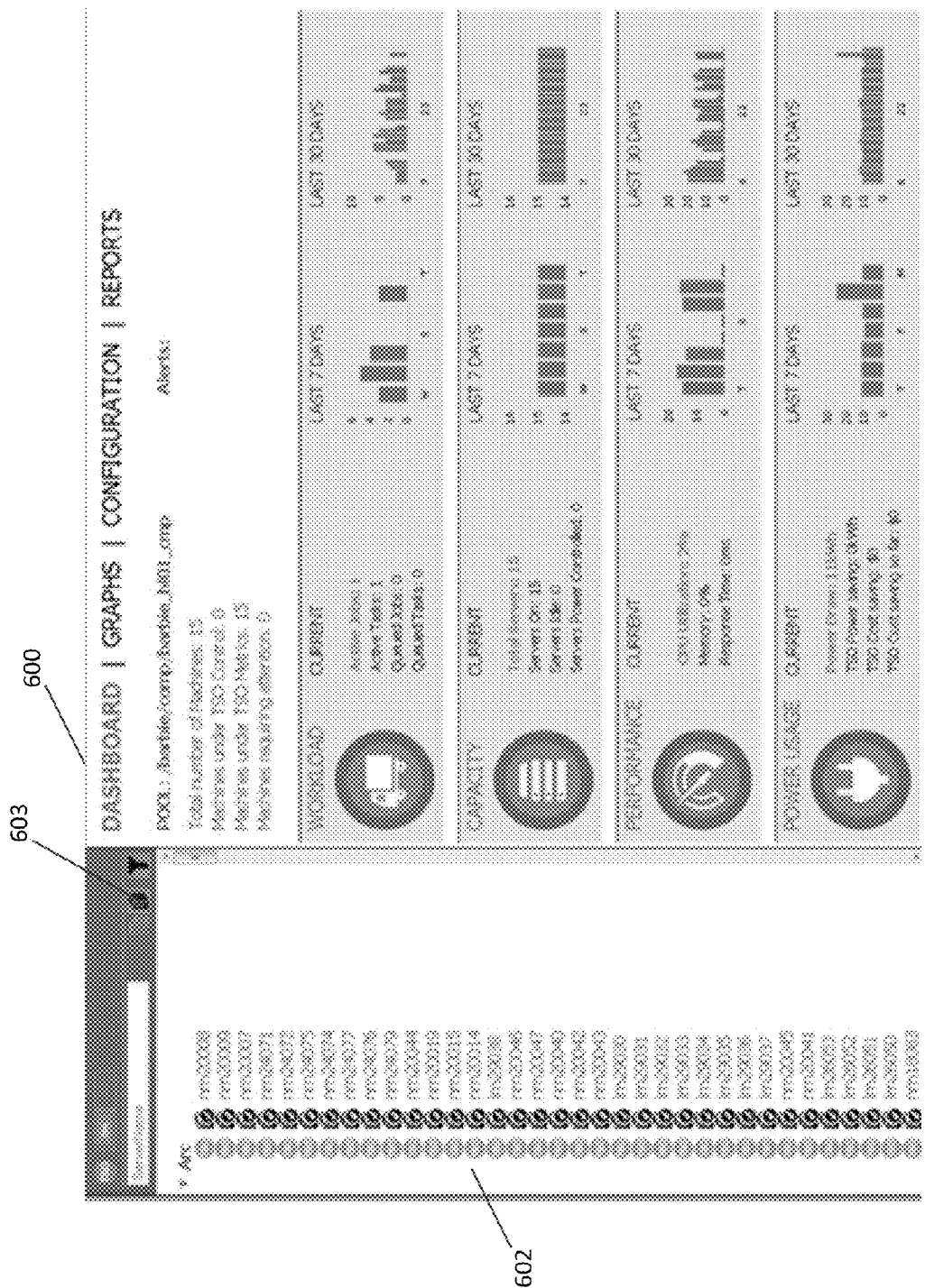
FIG. 6 shows a screen shot of a dashboard 600 for the power control system where the non-hierarchical display of all devices option 603 is selected

FIG. 6 shows a screen shot of a dashboard 600 for the power control system where the non-hierarchical display of all devices option 603 is selected. Left pane of FIG. 6 shows the non-hierarchical display 602 of all devices under the power control system.

Figure 7:
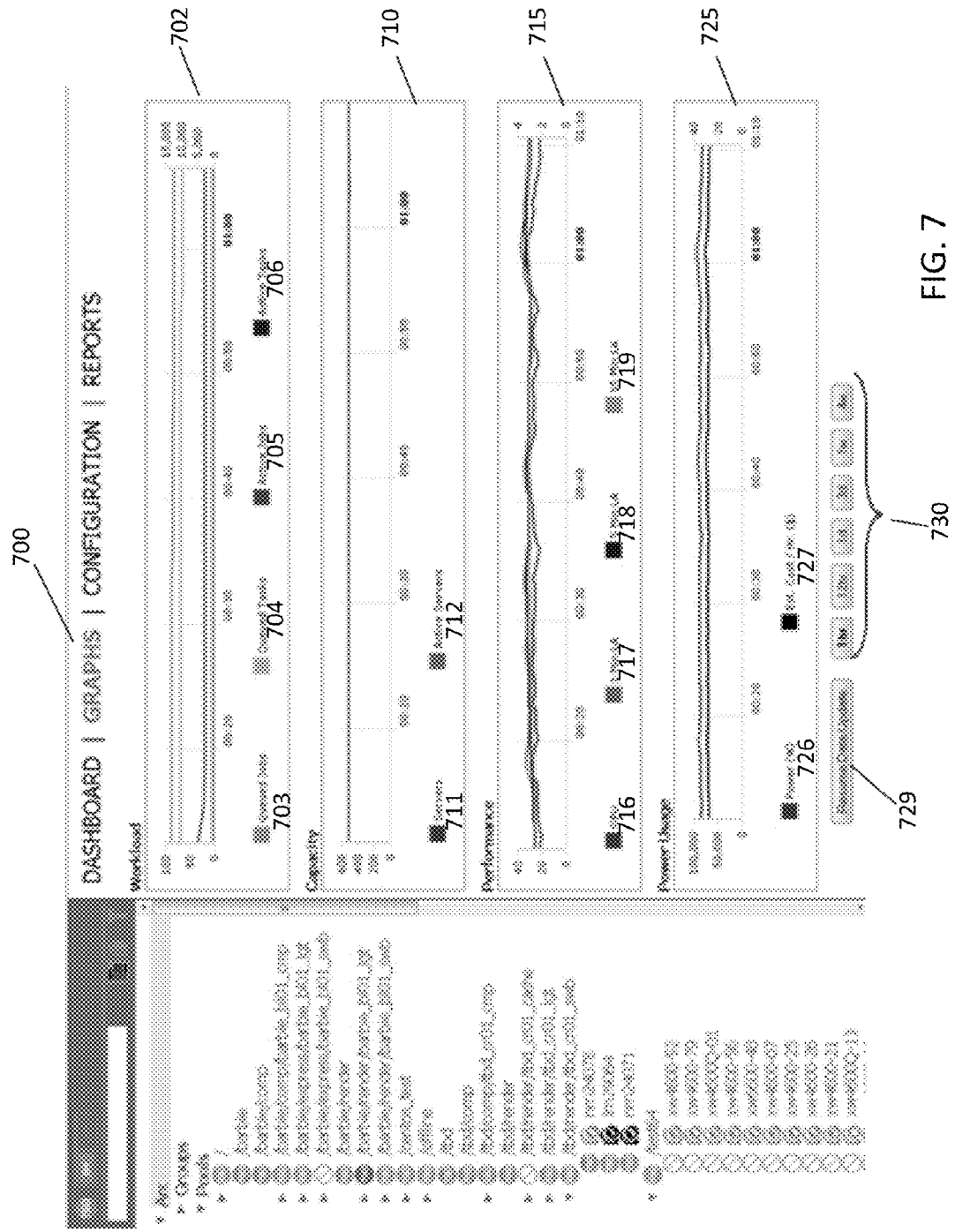
FIG. 7 shows a screen shot of a graphs tab 700 for the power control system, according to certain embodiments.

FIG. 7 shows a screen shot of a graphs tab 700 for the power control system. According to certain embodiments, graphs tab 700 includes but is not limited to workload graphs 702, capacity graphs 710, performance graphs 715 and power usage graphs 725.

According to certain embodiments, workload graphs 702 includes but is not limited to queued jobs graph 703, queued tasks graph 704, active jobs graph 705, and active tasks graph 706. According to certain embodiments, the power control system allows the user to configure the types of workload graphs. The workload graphs may vary from implementation to implementation.

According to certain embodiments, capacity graphs 710 includes but is not limited to the total available servers graph 711 and active servers graph 712. According to certain embodiments, the power control system allows the user to configure the types of capacity graphs. The capacity graphs may vary from implementation to implementation.

According to certain embodiments, performance graphs 715 includes but is not limited to CPU utilization 716, and load average times 717, 718 719. According to certain embodiments, the power control system allows the user to configure the types of performance graphs. The performance graphs may vary from implementation to implementation.

According to certain embodiments, power usage graphs 725 includes but is not limited to the power consumed graph 726 and an estimated cost of power graph 727. According to certain embodiments, the power control system allows the user to configure the types of power usage graphs. The power usage graphs may vary from implementation to implementation.

FIG. 7 shows that the GUI allows the user to resume data update by selecting button 729 (note that data collection can be paused). The user can also select, for generating and displaying graphical data, the time interval that the metric information was collected by selecting any of the buttons 730. According to certain embodiments, the power control system allows the user to configure the time intervals.

Figure 8:
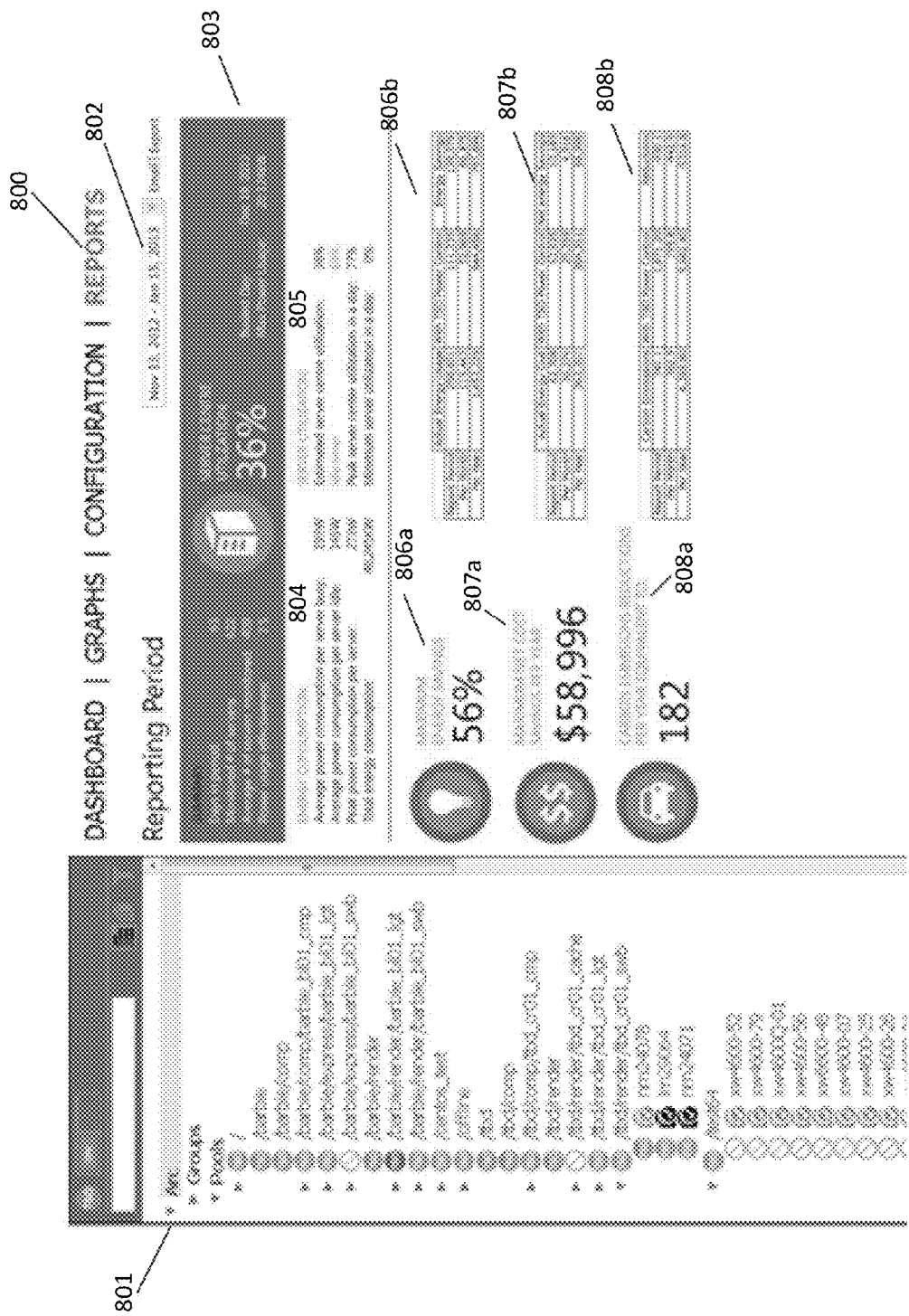
FIG. 8 shows a screen shot of a reports tab for the power control system, according to certain embodiments.

FIG. 8 shows a screen shot of a reports tab 800 for the power control system. According to certain embodiments, reports tab 800 includes but is not limited to a user selectable reporting period 802, summary information 803, energy consumption information 804, server utilization information 805, maximum energy savings information 806a, 806b, maximum net cost savings per year information 807a, 807b, and carbon emissions reductions information 808a, 808b, all of which is associated with a group of servers selected by the user at any level of the network hierarchy of servers. For purposes of illustration, FIG. 8 shows that the user has selected the top level of the hierarchy for generating and displaying the reports. The user may select servers at any level in the network hierarchy for generating and displaying the reports.

Figure 9:
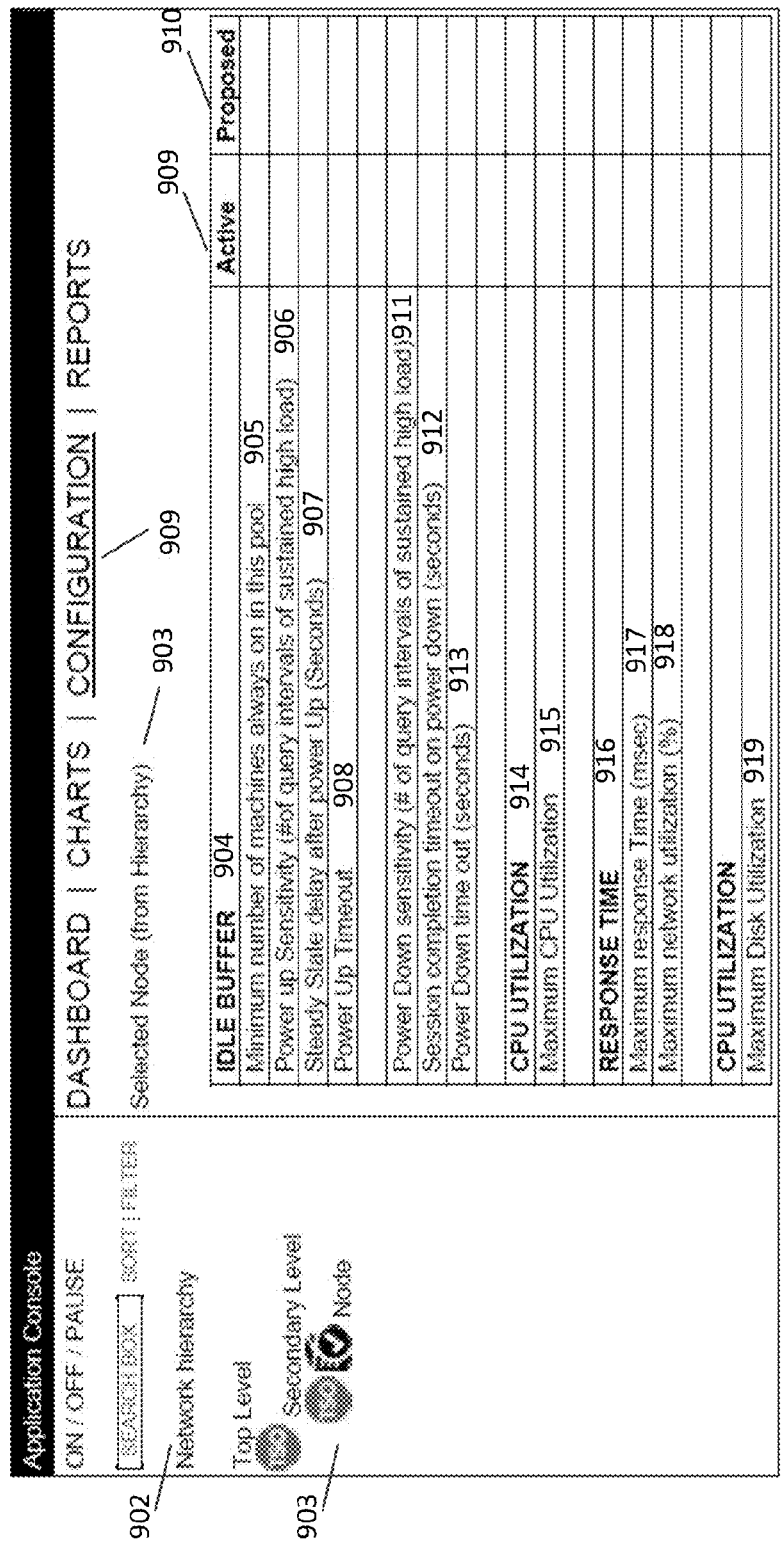
FIG. 9 shows a screen shot of a configuration tab for the power control system, according to certain embodiments.

FIG. 9 shows a screen shot of a configuration tab 900 for the power control system. According to certain embodiments, the user can select from the network hierarchy 902, a server node such as node 903, for configuration. For purposes of illustration, FIG. 9 shows the configurable parameter of selected node 903. The configurable parameters include but are not limited to idle buffer 904, CPU utilization 914, and response time 916. The configurable parameters may vary from implementation to implementation. Idle buffer 904 includes but is not limited to minimum number of servers always in the pool 905, power up sensitivity 906, steady state delay after power up 907, power up timeout 908, power down sensitivity 911, session completion timeout on power down 912, and power down timeout 913.

CPU utilization 914 includes but is not limited to maximum CPU utilization 915 and maximum disk utilization 919. Response time 916 includes but is not limited to maximum response time 917 and maximum network utilization 918. The user can input an active number 909 and a proposed number 910.

In the foregoing specification, embodiments of the invention have been described with reference to numerous specific details that may vary from implementation to implementation. The specification and drawings are, accordingly, to be regarded in an illustrative rather than a restrictive sense.

We claim:

1. A graphical user interface for power control comprising:
at least one real-time graphical display of loads including at least incoming requests associated with one or more collection of application servers;
at least one real-time graphical display of performance associated with the one or more collections of application servers; and
at least one real-time graphical display of power savings associated with the one or more collections of application servers;
wherein the graphical user interface allows a user to configure power up sensitivity or power down sensitivity, performance, and power parameters associated with one or more application servers of the one or more collections of application servers and allows the user to select a subset of application servers of the one or more collections of application servers and a time interval for calculating and displaying cost savings for the selected subset of application servers.

2. The graphical user interface of claim 1, wherein the graphical user interface allows a user to display a searchable, sortable hierarchy of application servers associated with the one or more collections of application servers with or without subfolders.

3. The graphical user interface of claim 1, wherein the loads include server utilization.

4. The graphical user interface of claim 1, wherein the graphical user interface allows a user to configure power up sensitivity or power down sensitivity of any one or more of: application servers, application server pools, application server farms, and collections of application servers.

5. The graphical user interface of claim 1, wherein the graphical user interface allows a user to configure sensitivity settings of a respective application server in the one or more collections of application servers based on time of day or power cost.

6. The graphical user interface of claim 1, wherein the graphical user interface allows a user to configure a minimum number of application servers to power up for a given time interval.

7. The graphical user interface of claim 1, wherein the graphical user interface allows a user to configure a maximum number of application servers to power up for a given time interval.

8. The graphical user interface of claim 1, wherein the graphical user interface allows a user to configure power server consumption.

9. The graphical user interface of claim 1, wherein the graphical user interface allows a user to automatically estimate power server consumption based on one or more of: default settings, system defined settings and user defined settings.

10. The graphical user interface of claim 1, wherein the graphical user interface allows a user to configure cost of power rate.

11. The graphical user interface of claim 1, wherein the graphical user interface allows a user to configure statistics collection intervals.

12. The graphical user interface of claim 1, wherein the graphical user interface allows a user to configure a maximum load per application server as a default setting or for a user specified time interval.

13. The graphical user interface of claim 1, wherein the graphical user interface allows a user to select load, performance and power information at a collection of application servers level, an application server farm level, at an application server pool level or at an individual application server level.

14. The graphical user interface of claim 1, wherein the graphical user interface allows a user to power on or off at least a subset of application servers in the one or more collections of application servers with a click of a button on the graphical user interface.

15. The graphical user interface of claim 1, wherein the graphical user interface allows a user to power on or off any one or more of: entire collections of application servers, entire application server farms, or entire application server pools with a click of a button on the graphical user interface.

16. The graphical user interface of claim 1, wherein the graphical user interface allows a user to include or exclude collections of application servers, application server farms, application server pools or individual application servers from power control.

17. The graphical user interface of claim 1, wherein the graphical user interface allows a user to include or exclude collections of application servers, application server farms, application server pools or individual application servers from statistical analysis.

18. The graphical user interface of claim 1, wherein the graphical user interface allows a user to configure performance criteria for at least one application associated with the one or more collections of application servers.

19. The graphical user interface of claim 18, wherein performance criteria include one or more of: threshold response time, threshold execution time, threshold render time, CPU utilization, and number of connections.

20. The graphical user interface of claim 1, wherein the graphical user interface allows a user to configure and schedule minimum application server count thresholds at a collection of application servers level, an application server farm level or an application server pool level.

21. The graphical user interface of claim 1, further comprising icons to represent state information of a respective collection of application servers, application server farm, application server pool or individual application server.

22. The graphical user interface of claim 21, wherein state information comprises any one of: On, On but disabled at a load balancer, Off, Off AND disabled at the load balancer, powering up, powering down, unknown state, unknown state AND disabled at the load balancer.

23. The graphical user interface of claim 1, wherein the graphical user interface allows a user to estimate capacity requirements at respective threshold settings for at least a subset of application servers selected by the user.

24. The graphical user interface of claim 1, wherein the graphical user interface allows a user to estimate performance levels at respective threshold settings for at least a subset of application servers selected by the user.

25. The graphical user interface of claim 1, further comprising real-time graphical displays of power usage associated with the one or more collections of application servers correlated to one or more events for a given point in time.

26. The graphical user interface of claim 1, further comprising real-time graphical displays of loads associated with the one or more collections of application servers correlated to one or more events associated with the one or more collections of application servers for a given point in time.

27. The graphical user interface of claim 1, further comprising real-time graphical displays of performance associated with the one or more collections of application servers correlated to one or more events associated with the one or more collections of application servers for a given point in time.

28. The graphical user interface of claim 1, further displays system defined events for a given point in time.

29. The graphical user interface of claim 1, further displays user defined events for a given point in time.

30. The graphical user interface of claim 28, wherein the system defined events are any one of: deployment of new software, change in configuration settings, peak workload, deployment of new hardware, application servers added, application servers removed, performance change, power management status, power cost change, power draw change, seasonal markers for holidays, aggregated versus non-aggregated data associated with the one or more collections of application servers.

31. The graphical user interface of claim 29, wherein the user defined events are any one of: user-changed cost of power, user-updated software version number or notes, change in hardware that is not detected, user notes, user reminders, user-defined seasonal markers associated with the one or more collections of application servers.

* * * * *